H. H. STRAUGHAN.
SISTER HOOK.
APPLICATION FILED MAY 12, 1909.
952,958.
Patented Mar. 22, 1910.
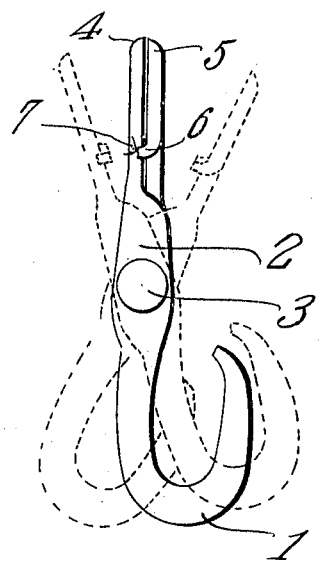
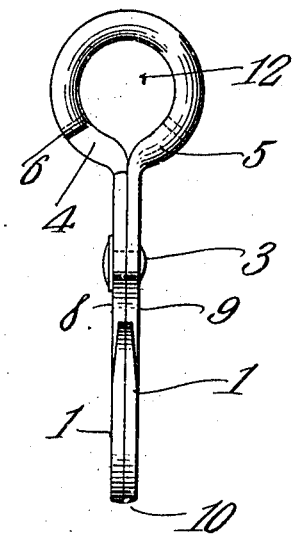
Witnesses
Inventor
Henry H. Straughan.
By C. A. Snow & Co.
Attorneys
Mason B. Lawton

UNITED STATES PATENT OFFICE.

HENRY H. STRAUGHAN, OF ROWLAND, NORTH CAROLINA.

SISTER-HOOK.

952,958. Specification of Letters Patent. Patented Mar. 22, 1910.

Application filed May 12, 1909. Serial No. 495,495.

*To all whom it may concern:*

Be it known that I, HENRY H. STRAUGHAN, a citizen of the United States, residing at Rowland, in the county of Robeson and State of North Carolina, have invented a new and useful Sister-Hook, of which the following is a specification.

The objects of the invention are, generally, the provision in a merchantable form, of a device of the class above mentioned, which shall be inexpensive to manufacture, facile in operation, and devoid of complicated parts; the provision of a device of the class above mentioned, comprising pivotally assembled sections, adapted to form, when brought into close relation, a hook at one end of the device, and an eye at the other, the eye-forming portions being provided with interlocking elements, and one of said eye-forming portions constituting a mousing for the other; other and further objects being made manifest hereinafter as the description of the invention progresses.

The invention consists in the novel construction and arrangement of parts hereinafter described, delineated in the accompanying drawings, and particularly pointed out in that portion of this instrument wherein patentable novelty is claimed for certain distinctive and peculiar features of the device, it being understood, that, within the scope of what hereinafter thus is claimed, divers changes in the form, proportions, size, and minor details of the structure may be made, without departing from the spirit, or sacrificing any of the advantages of the invention.

Similar numerals of reference are employed to denote corresponding parts throughout the several figures of the drawings.

In the accompanying drawings, Figure 1 is a side elevation; and Fig. 2 is a front elevation.

In carrying out my invention, I provide a pair of sections denoted generally by the numerals 8 and 9. Each of these sections 8 and 9, is bent at its lower end to form a hook 1, the hooks being similar in form. Above their hooked portions, the sections 8 and 9 are widened as denoted by the numeral 2, to provide a reinforced portion adapted to receive a rivet 3, whereby the sections may be pivotally assembled.

Above the pivotal union determined by the rivet 3, the section 8 is bent to form a laterally extending hook denoted by the numeral 4. The section 9 is similarly bent, save that its hook 5, extends in a direction opposite to the hook 4. These hooks 4 and 5 have substantially the same curvatures, so that when they are brought together, they form an eye 12 disposed in a plane normal to the plane of the hook 10 formed by the portions 1 of the device. Each of these portions 4 and 5 is arranged to overlap the other, so that the one forms a closure for the other.

Each of the portions 4 and 5 is terminally inbent toward its fellow as denoted by the numeral 6, and the section toward which the terminal of the other is inbent, is notched as denoted by the numeral 7 to receive said inbent portion, the inbent terminals 6 and the notches 7, constituting interlocking elements.

The device is adapted peculiarly, to be used as a trace-hook upon a harness, but I do not limit its application to the particular use last above pointed out. It will be found useful in setting up the standing rigging of vessels, for assembling tension elements with derricks and the like, and for many other purposes which will readily suggest themselves to the farmer and mechanic.

I regard it as important, that the eye which is formed by the portions 4 and 5, is disposed in a plane normal to the hook formed by the portions 1 of the device. By this construction, the greater the tension in the element which is assembled with the eye formed by the portions 4 and 5, the more securely will the device be held together, a condition which would not of necessity be obtained were the eye disposed in a common plane with the hook formed by the partitions 1.

The interlocking elements 6 and 7 serve to reinforce the eye formed by the portions 4 and 5, and to prevent the said portions from straightening out under an excessive strain.

Having thus described my invention what I claim as new and desire to protect by Letters Patent is:—

1. A sister hook comprising sections arranged, when brought into alinement, to form an eye at one end of the device, the sections terminating in similar, curved ends arranged, when brought into alinement, to form a hook at the other end of the device, open at one side, and disposed substantially normal to the plane of the eye, the sections being pivotally connected intermediate the hook and the eye.

2. A sister hook comprising sections arranged, when brought into alinement, to form an eye at one end of the device, the sections terminating in similar, curved ends, arranged, when brought into alinement, to form a hook at the other end of the device, open at one side, the sections being pivotally connected intermediate the hook and the eye, and each of eye-forming portions being arranged to form a closure for the other.

In testimony that I claim the foregoing as my own, I have hereto affixed my signature in the presence of two witnesses.

HENRY H. STRAUGHAN.

Witnesses:
E. M. HINES,
E. B. WARD.